United States Patent
Higashio et al.

(10) Patent No.: US 6,934,081 B2
(45) Date of Patent: *Aug. 23, 2005

(54) POLARIZING PLATE AND METHOD OF MANUFACTURING THE SAME, AND LIQUID CRYSTAL DISPLAY USING THE POLARIZING PLATE

(75) Inventors: Kazuhiro Higashio, Ibaraki (JP); Hisashi Mihara, Ibaraki (JP); Seiichi Kusumoto, Ibaraki (JP); Youichirou Sugino, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/246,772

(22) Filed: Sep. 19, 2002

(65) Prior Publication Data

US 2003/0072078 A1 Apr. 17, 2003

(30) Foreign Application Priority Data

Sep. 19, 2001 (JP) ........................................ 2001-285958

(51) Int. Cl.$^7$ ............................ G02B 27/28; G02B 5/30
(52) U.S. Cl. ....................... 359/485; 359/500; 264/1.31
(58) Field of Search ................................ 359/485, 499, 359/500; 156/99; 264/1.31, 1.34, 1.3

(56) References Cited

U.S. PATENT DOCUMENTS 5,699,136 A  12/1997  Arakawa et al. ............ 349/118
6,074,729 A   6/2000  Watanabe et al. ........... 428/212

FOREIGN PATENT DOCUMENTS

| EP | 1 160 591 A1 | 12/2001 |
|----|---|---|
| JP | 6-214116 | 8/1994 |
| JP | 7-98411 | 4/1995 |
| JP | 2001-100195 | 4/2001 |
| JP | 2001-343529 | 12/2001 |
| JP | 2002-28939 | 1/2002 |
| JP | 2002-174722 | 6/2002 |

Primary Examiner—Leonidas Boutsikaris
(74) Attorney, Agent, or Firm—Westerman, Hattori, Daniels & Adrian LLP

(57) ABSTRACT

A polarizing plate used for manufacturing a liquid crystal display with suppressed irregularity in brightness, a method of manufacturing the same, and a liquid crystal display using the same, are provided. The polarizing plate is formed having a laminate of a polarizing film and a transparent protective layer provided on at least one surface of the polarizing film. By heat-treating and subsequently reheat-treating, the laminate has a shrinkage force of at most 8N/10 mm width when the laminate is further left at 60° C. for 1 hour, and furthermore, the laminate has a single hue value b of at most 4.6 NBS.

29 Claims, 1 Drawing Sheet

POLARIZING PLATE AND METHOD OF MANUFACTURING THE SAME, AND LIQUID CRYSTAL DISPLAY USING THE POLARIZING PLATE

BACKGROUND OF THE INVENTION

1. Field of the Invention

The present invention relates to a polarizing plate that can form a liquid crystal display (hereinafter described as LCD) in which brightness irregularity is difficult to occur, and the liquid crystal display has a screen with optimized color tones.

2. Description of the Related Art

Polarizing plates have been used widely for liquid crystal displays, and the demand for the polarizing plates has been increased remarkably. Furthermore, high-value-added polarizing plates, e.g., a polarizing plate having an optical compensation function, have been used, and demand for display quality has further increased when considering some aspects such as a wide visual angle.

A polarizing plate for the above-described use can be prepared typically by laminating a protective film of triacetylcellulose or the like on both surfaces of a polarizing film made of a polyvinyl alcohol-based film (hereinafter described as a PVA-based film) in which iodine or a dichroic dyestuff is adsorbed and oriented (see JP 14(2002)-028939A and JP 13(2001)-343529A). A known optically compensating retardation plate has a triacetylcellulose film supporting an optically anisotropic layer formed by incline-orientating a discotic liquid crystal polymer. This optically compensating retardation plate will be adhered to a polarizing plate so as to provide a wide-visual-angle polarizing plate. Alternatively, the optically compensating retardation plate will be adhered directly to a polarizing film by using an adhesive (see JP 06(1994)-214116A and JP 07(1995)-98411 A).

However, a liquid crystal display having a panel equipped with a polarizing plate (especially the above-described wide-visual-angle polarizing plate) in crossed Nicols has a problem of brightness irregularity. The brightness irregularity means a lowering contrast, and it is caused by leakage of light beams from the backlight in the vicinity of the periphery of the display screen.

SUMMARY OF THE INVENTION

For solving the above-described problems, the present invention provides a polarizing plate that can decrease irregularity in the brightness and that optimizes color tones of a liquid crystal display screen. The present invention provides also a method of manufacturing the polarizing plate and a liquid crystal display using the polarizing plate.

For achieving the above-described object, the present invention provides a polarizing plate of a laminate including a polarizing film and a transparent protective layer provided on at least one surface of the polarizing film, wherein the laminate has a shrinkage force of at most 8N/10 mm width when it is left at 60° C. for 1 hour, and the laminate has a single hue value b of at most 4.6 NBS.

After keen examinations for overcoming the problem of brightness irregularity in the conventional technology, the inventors found that brightness irregularity is caused by a shrinkage of a polarizing plate due to heat that is generated at a backlight or the like and applied to the polarizing plate when the polarizing plate is placed in the liquid crystal display. This fact was supported by a close relationship between occurrence of the brightness irregularity and dimensional change in the polarizing plate by heat. The present invention can use a concept of suppressing occurrence of brightness irregularity by minimizing a shrinkage caused by heat during a use of the polarizing plate. This may be achieved by heat-treating a laminate including a polarizing film and a transparent protective layer and reheat-treating the laminate further, as described below, so as to shrink the laminate previously. Unlike the technique as described in JP 2002-174722A concerning a one-time heat treatment, performing of a reheat treatment as described in the present invention can improve the effect of suppressing brightness irregularity and decrease coloring on a white display of a liquid crystal display.

The term 'shrinkage force' denotes a rate of shrinkage in the longitudinal direction of a 10 mm width sample (e.g., a rectangular) that is cut off from the laminate, fixed at the both longitudinal ends and left at 60° C. for 1 hour. When the polarizing film is a stretched film, the stretching direction is determined as 'a longitudinal direction (length)' of the sample, while a direction transverse to the stretching direction is referred to as a 'width direction (width)'. For such a stretched film, a shrinkage force in the longitudinal direction will be measured.

According to the present invention, it is preferable that the laminate is heat-treated and subsequently, reheat-treated.

A range of temperature of the heat treatment is, for example, from 40° C. to 75° C., preferably from 50° C. to 75° C., and more preferably from 50° C. to 70° C.

The temperature for the reheat treatment is preferred to be, for example, higher by at least 5° C. than the surface temperature of the laminate right before the reheat treatment. Specifically for example, it is from 50° C. to 90° C. for sufficient heating and sufficient prevention of coloring caused by overheating, also in an aspect of an excellent stability in manufacture. More preferable range is from 55° C. to 90° C., and a particularly preferable range is from 55° C. to 85° C.

It is preferable that the laminate is heat-treated, left for lowering the temperature, and reheat-treated further. Specifically, the temperature is lowered to a point that is lower than the heat-treating temperature by a range of 5° C. to 75° C. and lower than the reheat-treating temperature by a range of 5° C. to 90° C., and subsequently reheat-treated. It is preferable that the temperature of the surface of the laminate is within this temperature range.

As mentioned above, the inventors found that there is a close relationship between brightness irregularity of a polarizing plate and a dimensional change rate. Namely, a dimensional change rate for the laminate that is further left at 50° C. for 120 hours is preferably in a range of −0.3% to 0% in the stretching direction (MD direction). More preferably, the range is from −0.28% to 0%, and a particularly preferred range is from −0.25% to 0%. As described below, for example, a shrinkage of a polarizing plate can be suppressed sufficiently by previously heat-treating and reheat-treating the laminate so as to set the dimensional change rate within the above-identified range. This can serve to suppress occurrence of brightness irregularity further certainly. Such a polarizing plate can be used for providing a liquid crystal display with decreased irregularity in the brightness.

The dimensional change rate is can be calculated by using from the following formula.

$$\text{Dimensional change rate } (\%) = [(La' - La)/La] \times 100$$

In the formula, La denotes a dimension in the stretching direction (MD direction) of the laminate, and La' denotes a dimension in the MD direction of the same laminate that is further left at 50° C. for 120 hours.

Furthermore, it has been found that there is a relationship between a shrinkage force and a weight change rate, and thus the polarizing plate shows shrinkage behavior by lowering the weight change rate (weight reduction rate). Therefore, brightness irregularity can be suppressed sufficiently by lowering the weight change rate and previously shrinking the polarizing plate. From this point of view, it is preferable that the weight change rate of the laminate that is further left at 120° C. for 2 hours is at most 3%, or more preferably, at most 2.8%, and particularly preferably, at most 2.5%. Control of the weight change rate of the laminate to be at most 3% serves to further suppress occurrence of brightness irregularity without being influenced by varying humidity environment. Heat treatment is particularly preferable for controlling the weight change rate, and thus improving the effect of preventing brightness irregularity of the polarizing plate.

The weight change rate can be calculated on the basis of the following formula.

$$\text{Weight change rate } (\%) = [(Wa-Wa')/Wa] \times 100$$

In the formula, Wa denotes the weight of the laminate, and Wa' denotes the weight of the laminate that is further left at 120° C. for 2 hours.

In the polarizing plate of the present invention, the transparent protective layer can have an optically compensating function. Brightness irregularity will occur easily when the polarizing plate has an additional plate, e.g., an optically compensating retardation plate having an optically anisotropic layer of incline-oriented discotic liquid crystal polymer supported by a film. However, when the transparent protective layer has the optically compensating function, the wide-visual-angle polarizing plate will be less shrinkable and the brightness irregularity will be further suppressed.

The polarizing plate according to the present invention can have a viewing-angle compensating film provided on at least one surface of the laminate.

It is preferable that the polarizing plate has an adhesive layer (or a pressure-sensitive adhesive layer) provided on at least one surface of the laminate. This will serve to facilitate lamination of the polarizing plate on a liquid crystal cell or the like.

There is no specific limitation on the kind of the polarizing plate of the present invention. For example, it can be a reflective polarizing plate or a semitransparent polarizing plate. Such a reflective polarizing plate or a semitransparent polarizing plate can be prepared by providing either a reflector or a transflector on at least one surface of the laminate.

The polarizing plate can be an elliptically polarizing plate or a circularly polarizing plate that has further a retardation plate on at least one surface of the laminate.

Examples of the retardation plates include wavelength (λ) plates such as a half wavelength plate and a quarter wavelength plate, though there is no specific limitation.

The polarizing plate according to the present invention can have further a brightness enhancement film provided on at least one surface of the laminate.

Next, a method of manufacturing the polarizing plate according to the present invention, wherein the polarizing plate comprises a laminate including a polarizing film and a transparent protective layer provided on at least one surface of the polarizing film, and the method comprises heat treatment and a subsequent reheat treatment of the laminate so as to control a shrinkage force of the reheat-treated laminate to be at most 8N/10 mm width when the reheat-treated laminate is further left at 60° C. for 1 hour, and to control a single hue value b of the laminate to be at most 4.6 NBS.

A liquid crystal display according to the present invention comprises a liquid crystal cell and the polarizing plate of the present invention, and the polarizing plate is arranged on at least one surface of the liquid crystal cell. The liquid crystal display using the polarizing plate that decreases shrinkage caused by heat will be highly precise and in which occurrence of brightness irregularity will be suppressed.

DETAILED DESCRIPTION OF THE INVENTION

Figure 1:
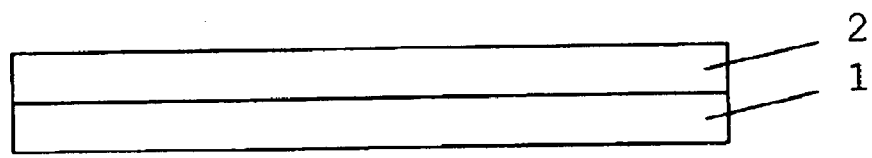
FIG. 1 is a schematic view of a polarizing plate having a transparent protective layer on one surface of the polarizing film
Figure 2:
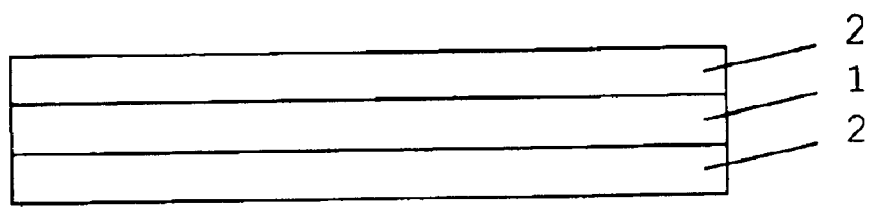
FIG. 2 is a schematic view of a polarizing plate having transparent protective layers on both surfaces of the polarizing film.

As mentioned above, a polarizing plate according to the present invention includes a laminate of a polarizing film and a transparent protective layer that is provided on at least one surface of the polarizing film, wherein the laminate has a shrinkage force of at most 8N/10 mm width when it is further left at 60° C. for 1 hour, and the laminate has a single hue value b of at most 4.6 NBS. Examples of polarizing plates are shown on FIGS. 1 and 2. Reference numeral 1 denotes a polarizing film and reference numeral 2 denotes a transparent protective film.

When the shrinkage force is 8N/10 mm width or less, for example, the brightness irregularity can be suppressed sufficiently due to the effect of the heat treatment and the reheat treatment. When the single hue value b is 4.6 NBS or less, for example, no coloring will be visible in a white display of a liquid crystal display screen, i.e., the obtained polarizing plate is excellent in use in an aspect of the optical characteristics. In contrast, when the shrinkage force exceeds 8N/10 mm width, the effect of the heat treatment and the reheat treatment is decreased and the brightness irregularity may not be solved sufficiently. When the single hue value b exceeds 4.6 NBS, colors will be visible in the white display of the liquid crystal display screen, and such a polarizing plate cannot be used in an aspect of the optical characteristics.

Preferably, the above-described shrinkage force obtained by further leaving the laminate at 60° C. for 1 hour is at most 7N/10 mm width. More preferably, it is at most 6.5 N/10 mm width. Preferably, the single hue value b of the laminate is at most 4.55 NBS, and more preferably, it is at most 4.5 NBS.

The single hue value b is defined by a Hunter Lab Color System (Hunter, R. S.: J. Opt. Soc. Amer., 38, 661(A), 1094(A) (1948); J. Opt. Soc. Amer., 48, 985 (1958)). Specifically, a single hue value b can be calculated by, for example, measuring tristimulus values (X, Y, Z) of a sample by using a spectrophotometer or a photoelectric calorimeter in accordance with JIS K 7105 5.3, and substituting these values as the color difference formula in Lab space into the following Hunter's formula. A C-light source is used for the measurement. Both the single hue value b and transmittance can be measured by using an integrating sphere type spectral transmittance meter (DOT-3C produced by Murakami Color Research Laboratory).

$$\text{Single hue value } b=7.0\times(Y-0.847Z)/Y^{1/2}$$

Such a polarizing plate can be obtained by laminating a transparent protective layer on at least one surface of a polarizing film, heat-treating the thus formed laminate, and further reheating the laminate. More specifically, a heat-treated laminate is reheated after being left to a temperature lower than the temperatures of the heat-treatment and the reheat-treatment.

Though not limited specifically, conditions for the first heat treatment of the laminate include a heating temperature in a range of 40° C. to 75° C. and a heating time in a range of 0.5 minutes to 60 minutes. Preferably, the heating temperature is from 50° C. to 75° C. and the heating time is from 1 minute to 50 minutes, and more preferably, the heating temperature is from 50° C. to 70° C. and the heating time is from 1 minute to 30 minutes.

There is no specific limitation on conditions for the heat treatment of the laminate. For example, temperatures and times for reheating will be determined so as to satisfy the condition of the shrinkage force and the single hue value b. Specifically, a preferable range of the reheating temperature is from 50° C. to 90° C. and a preferable range of the reheating time is from 0.5 minutes to 30 minutes, or more preferably, from 1 minute to 30 minutes, though the conditions can vary depending on the kinds of the polarizing plate, for example, the polarizing film and/or the transparent protective film, and the thickness of the laminate.

Specifically, preferred ranges for the temperature and the time for reheating an iodine-adsorbed polarizing film are from 50° C. to 90° C. and from 0.5 minutes to 30 minutes. More preferably, the reheating temperature is from 55° C. to 90° C., and the reheating time is from 0.5 minutes to 30 minutes. Particularly preferable ranges of the temperature and time for reheating are from 55° C. to 85° C. and from 1 minute to 30 minutes.

It is preferable that, after the heat treatment, a surface temperature of the laminate is once lowered to a temperature, for example, lower than the heating temperature by a range of 5° C. to 75° C. and lower than the reheating temperature by a range of 5° C. to 90° C. More preferably, the surface temperature is lower than the heating temperature by a range of 10° C. to 75° C. and lower than the reheating temperature by a range of 10C to 90° C.

Specifically it is preferable, for example, the temperature is once lowered to a range of 0° C. to 35° C. after the heat treatment, when the heating temperature is 65° C. and the reheating temperature is 65° C.

There is no specific limitation on the thickness of the laminate to be heat-treated. For example, it is from 10 µm to 1000 µm, preferably from 25 µm to 800 µm, and more preferably from 25 µm to 600 µm.

The heat treatment and the reheat treatment can be used for e.g., a rolled laminate or a sheet-type laminate. Considering the heating effects and uniformity, the sheet-type laminate is advantageous. Considering the productivity, it is preferable that the sheet-type laminate is heated continuously using a coating machine, a heat roller, etc.

The polarizing film can be prepared by any known method. That is, it can be made by adsorbing a dichroic substance such as iodine and dichroic dyestuff in a film, crosslinking, stretching and drying the film. The film can be selected from a PVA-based film, a partially formalized PVA-based film, a partially saponified film based on an ethylene vinyl acetate copolymer, and hydrophilic polymer films such as a cellulose-based film. Alternatively polyene oriented films of dehydrated PVA and dehydrochlorinated polyvinyl chloride can be used as well. Among them, a PVA-based film is advantageous.

The polarizing film has a thickness of 5 µm to 80 µm in general, though there is no specific limitation.

The transparent protective layer can be any known transparent protective film without any specific limitations. Preferably, the layer is excellent in some characteristics such as transparency, mechanical strength, thermal stability, moisture shielding property, and isotropism. Specific examples of materials for the transparent protective layer include cellulose-based resins such as triacetylcellulose, and transparent resins based on e.g., polyester, polycarbonate, polynorbornene, polyolefin, polyamide, polyimide, polyethersulfone, polysulfone, polystyrene, acrylic substances, and acetate. Resins that will be cured by heat or ultraviolet rays, which is based on e.g., acrylic substances, urethane, acrylic urethane, epoxy, and silicones, can be used as well.

Alternatively, polymer films described in JP 2001-343529 A (WO 01/37007) can be used as well, and such a film is prepared, for example, by extruding a resin composition containing an alternating copolymer of isobutene and N-methylmaleimide and an acrylonitrile-styrene copolymer.

The transparent protective layer can have an optically compensating function. Such a transparent protective layer having the optically compensating function can be a known layer used for preventing coloring or for widening a preferable visual angle that will be caused by changes in the visual angles, based on a phase difference. Specific examples include various films of the above-described transparent resins that is stretched uniaxially or biaxially, an oriented film of a liquid crystal polymer or the like, and a laminate having a transparent substrate and an oriented layer of e.g., a liquid crystal polymer. An oriented film of the liquid crystal polymer is advantageous especially since it can provide a wide visual angle with excellent visibility. Particularly advantageous is an optically compensating retardation plate including an optically compensating layer supported by a triacetylcellulose film, where the optically compensating layer is made of an incline-oriented layer of a discotic or nematic liquid crystal polymer. This optically compensating retardation plate is supplied, for example, as 'WV film' by Fuji Photo Film Co., Ltd or the like. Alternatively, the optically compensating retardation plate can be prepared by laminating two layers or more of the retardation film and a film supporter of triacetylcellulose film or the like so as to control the optical characteristics such as a phase difference.

The thickness of the transparent protective layer is not limited specifically but it can be determined appropriately depending on some factors such as the phase difference and protection strength. In general, the thickness is at most 5 mm, and advantageously at most 1 mm and further advantageously, it is in a range of 1 µm to 500 µm.

The transparent protective layer can be prepared appropriately according to any known methods such as coating of the transparent resin on the polarizing film and laminating of e.g., the transparent resin film or the optically compensating retardation plate on the polarizing film. Commercial products can be used as well.

A transparent protective film used for the protective layer can be treated to provide characteristics such as hard coating, antireflection, diffusion and anti-glaring. Hard coating treatment is applied, for example, to prevent scratches on the surfaces of the polarizing plate. For example, a surface of the transparent protective film can be applied with a coating film of a cured resin with excellent hardness and smoothness. The cured resin can be selected from ultraviolet cured resins of silicone base, urethane base, acrylic, and epoxy base. The treatment can be carried out in a known method. Antireflection treatment may be applied to prevent reflection of external light on the surface of the polarizing plate, and carried out by forming such an anti-reflection film or the like in a known method.

A purpose of anti-glare treatment is to prevent reflection of external light on the polarizing plate surface from hindering visibility of light transmitted through the polarizing plate. The anti-glare treatment can be carried out by providing microscopic asperity on a surface of a transparent protective film in an appropriate manner, e.g., by roughening the surface by sand-blasting or embossing, or by forming the transparent protective layer by blending transparent particles in the above-described transparent resin.

The above-described transparent fine particles will be selected from silica, alumina, titania, zirconia, stannic oxide, indium oxide, cadmium oxide, antimony oxide or the like. Inorganic fine particles having electroconductivity can be used as well. Alternatively, the particles can be organic fine particles comprising, for example, crosslinked or uncrosslinked polymer particles. The average diameter of the transparent particles is, for example, from 0.5 $\mu$m to 20 $\mu$m, through there is no specific limitation. An amount of the transparent fine particles is from 2 weight parts to 70 weight parts, and generally, from 5 weight parts to 50 weight parts, for 100 weight parts of a transparent resin, though there is no specific limitation.

An anti-glare layer comprising transparent fine particles can be provided as the transparent protective layer or a coating layer applied onto the transparent protective layer surface. The anti-glare layer can function as a diffusion layer to diffuse light transmitted through the polarizing plate in order to enlarge visual angles.

The above-mentioned layers such as the antireflection layer, the diffusion layer and the anti-glare layer can be provided in the polarizing plate, as an sheet of optical layers comprising these layers, separately from the transparent protective layer.

The transparent protective layer can be laminated on one or both surfaces of the polarizing film. When the transparent protective layers are arranged on both surfaces of the polarizing film, the transparent protective layers on the surfaces can be the same or can be varied.

The above-described polarizing film can be adhered to the transparent protective layer (particularly an optically compensating retardation plate) in a known method without any specific limitations. In general, adhesives or pressure-sensitive adhesives can be used, and the adhesive can be selected appropriately depending on the kinds of the polarizing films and the transparent protective layer. When the polarizing film is based on polyvinyl alcohol, a polyvinyl alcohol-based adhesive is advantageous in an aspect of stability in adhesion. These adhesives and pressure-sensitive adhesives can be applied directly to the surfaces of the polarizing film and/or the transparent protective layer. Alternatively, an adhesive or a pressure-sensitive adhesive can be formed as a layer such as a tape or a sheet, and arranged on the surface of the polarizing film or the transparent protective layer.

It is preferable that a polarizing plate according to the present invention has an adhesive layer (or a pressure-sensitive adhesive layer) for facilitating lamination onto a liquid crystal cell or the like. Such an adhesive layer can be arranged on one or both surfaces of the polarizing plate. For the purpose, a solution or melt of an adhesive is applied directly on a predetermined surface of the polarizing plate by a development method such as flow-expansion and coating. Alternatively, an adhesive layer is formed on a separator in the same manner and transferred to a predetermined surface of the polarizing plate. This adhesive layer can be formed on any surface of the polarizing plate. For example, it can be formed on an exposed surface of the optically compensating retardation plate of the polarizing plate.

When a surface of an adhesive layer on a surface of the polarizing plate is exposed, preferably, the adhesive layer is covered with a separator by the time the adhesive layer is used so that contamination will be prevented. The separator can be made of an appropriate thin sheet such as a transparent protective film by coating a peeling agent if required, and the peeling agent may be selected, for example, from a silicone-based agent, a long-chain alkyl-based agent, a fluorine-based agent, an agent comprising molybdenum sulfide or the like.

The adhesive layer can be a monolayer or a laminate. The laminate can include monolayers different from each other in the type or in the compositions. When arranged on both surfaces of the polarizing plate, the adhesive layers can be same or can be varied.

The thickness of the adhesive layer can be determined appropriately depending on the constituents or the like of the polarizing plate. In general, it is from 1 $\mu$m to 500 $\mu$m.

It is preferable that the adhesive layer is made of an adhesive having excellent optical transparency and appropriate characteristics such as wettability, cohesiveness, and adhesiveness. The adhesive can be prepared appropriately based on polymers such as an acrylic polymer, a silicone-based polymer, polyester, polyurethane, polyether, and synthetic rubber.

Adhesiveness of the adhesive layer can be controlled appropriately in a known method. For example, the degree of cross-linkage and the molecular weight will be adjusted on the basis of a composition or molecular weight of the base polymer, crosslinking method, a content of the crosslinking functional group, and an amount of the blended crosslinking agent.

The polarizing plate of the present invention, which is heat-treated and reheat-treated, can be laminated with another optical layer in order to be used as an optical member. Though there is no specific limitation on the optical layer, the examples include optical layers used for forming liquid crystal displays or the like, i.e., a reflector, a transflector, a retardation plate such as a $\lambda$ plate like a half wavelength plate and a quarter wavelength plate, a viewing-angle compensating film, and a brightness-enhancement film. These optical layers can be used alone or can be combined with any other layers. Particularly preferable optical members include reflective polarizing plate, a semi-transparent reflective polarizing plate, an elliptically polarizing plate, a circularly polarizing plate, and a polarizing plate having a viewing-angle compensating film laminated thereon.

When the polarizing plate has any of the above-described additional optical layers, the optical layer can be arranged after a heat treatment and reheat treatment of the above-described laminate including a polarizing film and a transparent protective layer. Alternatively, such an optical layer can be provided on the laminate before the heat treatment and the reheat treatment.

The above-described polarizing plates will be explained below in detail.

First, an example of the reflective polarizing plate or the semitransparent reflective polarizing plate according to the present invention will be described. The reflector is provided to a reheat-treated polarizing plate in order to form a reflective polarizing plate, and the transflector is provided to a reheat-treated polarizing plate in order to form a semitransparent reflective polarizing plate.

In general, such a reflective polarizing plate is arranged on a backside of a liquid crystal cell in order to make a liquid crystal display to reflect incident light from a visible side (display side). The reflective polarizing plate has some merits, for example, assembling of light sources such as backlight can be omitted, and the liquid crystal display can be thinned further.

The reflective polarizing plate can be formed in any known manner such as forming a reflector of metal or the like on one surface of the polarizing plate. For example, a transparent protective film of the polarizing plate is prepared by matting one surface (exposed surface) if required. On this surface, a foil comprising a reflective metal such as aluminum or a deposition film is applied to form a reflective polarizing plate.

An additional example of a reflective polarizing plate comprises the above-mentioned transparent protective film having a surface of a microscopic asperity due to contained fine particles, and also a reflector corresponding to the microscopic asperity. The reflector having a microscopic asperity surface diffuses incident light by irregular reflection so that directivity and glare can be prevented and irregularity in color tones can be controlled. This reflector can be formed by disposing a metal foil or a metal deposition film directly on a microscopic asperity surface of the transparent protective layer in any appropriate methods including deposition such as vacuum deposition, and plating such as ion plating and sputtering.

Alternatively, the reflector can be used as a reflecting sheet formed by providing a reflecting layer onto a proper film similar to the transparent protective film. Since a typical reflecting layer of a reflector is made of a metal, it is preferable in use of the reflector that the reflecting surface of the reflecting layer is coated with a film, a polarizing plate or the like in order to prevent the reflection rate from reduction due to oxidation. As a result, the initial reflection rate is maintained for a long period, and a separate protective layer can be omitted.

A semitransparent polarizing plate is provided by replacing the reflector in the above-mentioned reflective polarizing plate by a transflector, and it is exemplified by a half mirror that reflects and transmits light at the reflecting layer.

In general, such a semitransparent polarizing plate is arranged on a backside of a liquid crystal cell. In a liquid crystal display comprising the semitransparent polarizing plate, incident light from the visible side (display side) is reflected to display an image when the liquid crystal display is used in a relatively bright atmosphere, while in a relatively dark atmosphere, an image is displayed by using a built-in light source such as a backlight in the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following explanation is about an elliptically polarizing plate or a circularly polarizing plate formed by laminating a retardation plate or λ plate on a polarizing plate that is previously reheat-treated.

The above-described elliptically polarizing plate is effective in compensating (preventing) colors (blue or yellow) generated due to birefringence in a liquid crystal layer of a super twist nematic (STN) liquid crystal display so as to provide a black-and-white display free of such colors. An elliptically polarizing plate with controlled three-dimensional refractive index is preferred further since it can compensate (prevent) colors that will be observed when looking a screen of the liquid crystal display from an oblique direction. The circularly polarizing plate is effective in adjusting color tones of an image of a reflective liquid crystal display that has a color image display, and the polarizing plate serves to prevent reflection as well.

The retardation plate is used for modifying linearly polarized light to either elliptically polarized light or circularly polarized light, modifying either elliptically polarized light or circularly polarized light to linearly polarized light, or modifying a polarization direction of linearly polarized light. For example, a retardation plate called a quarter wavelength plate (λ/4 plate) is used for modifying linearly polarized light to either elliptically polarized light or circularly polarized light, and for modifying either elliptically polarized light or circularly polarized light to linearly polarized light. A half wavelength plate (λ/2 plate) is used in general for modifying a polarization direction of linearly polarized light.

Examples of the retardation plates include birefringent films, oriented films of liquid crystal polymers, and laminates of oriented layers of liquid crystal polymers supported by the films. The birefringent films can be prepared by stretching films of any suitable liquid crystal polymers such as polycarbonate, polyvinyl alcohol, polystyrene, polymethyl methacrylate, polyolefins including polypropylene, polyalylate, polyamide, and polynorbornene.

The retardation plate can have a phase difference suitable for intended uses such as compensation of a visual angle (e.g., widening of visual angle) and compensation of coloring caused by birefringence of the liquid crystal layer, or plates having varied wavelengths such as a half wavelength plate and a quarter wavelength plate. Alternatively, the retardation plate can be an incline-oriented film having a refractive index controlled in the thickness direction. Two or more kinds of retardation plates can be laminated for forming a laminate with controlled optical characteristics such as the phase difference.

The incline-oriented film is produced, for example, by bonding a heat shrinkable film onto a polymer film and stretching and/or shrinking the polymer film under an influence of a shrinking force provided by the heat, or by orienting obliquely a liquid crystal polymer.

The polarizing plate described below comprises an additional viewing-angle compensating film laminated on the reheat-treated polarizing plate.

The viewing-angle compensating film is used for widening a visual angle so that an image can be clear relatively when a screen of a liquid crystal display is seen not in a direction perpendicular to the screen but in a slightly oblique direction. Such a viewing-angle compensating film can be a triacetylcellulose film coated with a discotic liquid crystal, or a retardation plate. While an ordinary retardation plate is a birefringent polymer film that is stretched uniaxially in the face direction, a retardation plate used for an viewing-angle compensating film is a two-way stretched film such as a birefringent polymer film stretched biaxially in the face direction and an incline-oriented polymer film with controlled birefringence in the thickness direction that is stretched uniaxially in the face direction and stretched also in the thickness direction. The incline-oriented film is prepared by, for example, bonding a heat shrinkable film to a polymer film and stretching and/or shrinking the polymer film under an influence of a shrinkage force provided by heat, or by orienting obliquely a liquid crystal polymer. A polymer as a material of the retardation plate is similar to the polymer used for the above-mentioned retardation plate.

A polarizing plate described below includes further a brightness enhancement film laminated on the reheat-treated polarizing plate.

Generally, this polarizing plate is arranged on a backside of a liquid crystal cell. When natural light enters, by reflection from a backlight or a backside of a liquid crystal display etc., the brightness enhancement film reflects linearly polarized light of a predetermined polarizing axis or circularly polarized light in a predetermined direction while the same film transmits other light. It allows entrance of light from a light source such as a backlight so as to obtain transmitted light in a predetermined polarization state, while reflecting light other than light in the predetermined polarization state. Light that is reflected at this brightness enhancement film is reversed through a reflector or the like arranged additionally behind the brightness enhancement film. The reversed light that re-enters the brightness enhancement film is transmitted partly or entirely as light in a predetermined polarization state, so that light transmitting the brightness enhancement film is increased and polarized light that is hardly absorbed in the polarizing film (polarizer) is supplied. As a result, quantity of light available for the liquid crystal display etc. can be increased to enhance brightness. When light enters through a polarizer from the backside of a liquid crystal cell by using a backlight or the like without using any brightness enhancement films, most light is absorbed in the polarizer but not transmitted the polarizer if the light has a polarization direction inconsistent with the polarization axis of the polarizer. Depending on characteristics of the polarizer, about 50% of light is absorbed in the polarizer, and this decreases quantity of light available in the liquid crystal display or the like and makes the image dark. The brightness enhancement film repeatedly prevents light having a polarization direction to be absorbed in the polarizer from entering the polarizer, and reflects the light on the brightness enhancement film, reverses the light through a reflecting layer or the like arranged behind, and makes the light re-enter the brightness enhancement plate. Since the polarized light that is reflected and reversed between them is transmitted only if the light has a polarization direction to pass the polarizer, light from a backlight or the like can be used efficiently for displaying images of a liquid crystal display in order to provide a bright screen.

A diffusion plate can also be provided with the polarizing plate, for example, between the brightness enhancement film and a reflective layer such as the above-described reflector. Polarized light reflected by the brightness enhancement film is directed to the reflector. The diffusion plate diffuses the passing light uniformly and at the same time, it cancels the polarization so as to provide a depolarized state. Namely, the diffusion plate converts the light back into its original state as natural light. This depolarized light, i.e., natural light is directed to the reflector, reflected at the reflector, and it passes again the diffusion plate so as to re-enter the brightness enhancement film. The state of natural light is recovered by repeating this series of actions. Thereby, the diffusion plate serves to maintain brightness of the display screen and decrease irregularity in the brightness. That is, a display screen having uniform brightness can be obtained by providing a diffusion plate for recovering natural light, since the diffusion plate has a diffusion function and further it can increase appropriately the repeated reflection of the initial incident light.

Though there is no specific limitation, the brightness enhancement film is advantageously selected from a multilayer thin film of a dielectric or a multilayer lamination of thin films with varied refraction aeolotropy that transmits linearly polarized light having a predetermined polarization axis while reflecting other light, and a cholesteric liquid crystal layer, more specifically, an oriented film of a cholesteric liquid crystal polymer or an oriented liquid crystal layer fixed onto a supportive substrate that reflects either clockwise or counterclockwise circularly polarized light while transmitting other light.

Therefore, for a brightness enhancement film to transmit linearly polarized light having a predetermined polarization axis, the transmission light enters the polarizing plate by matching the polarization axis so that absorption loss due to the polarizing plate is controlled and the light can be transmitted efficiently. For a brightness enhancement film to transmit circularly polarized light, i.e., a cholesteric liquid crystal layer, preferably, the transmission circularly polarized light is converted to linearly polarized light before entering the polarizing plate in an aspect of controlling of the absorption loss, though the circularly polarized light can enter the polarizer directly. Circularly polarized light can be converted to linearly polarized light by using a quarter wavelength plate for a retardation plate.

A retardation plate having a function as a quarter wavelength plate in a wide wave range including a visible light region can be obtained, for example, by overlapping a retardation layer functioning as a quarter wavelength plate for monochromatic light such as light having 550 nm wavelength and another retardation plate showing a separate optical retardation property (e.g., a retardation plate functioning as a half wavelength plate). Therefore, a retardation plate arranged between a polarizing plate and a brightness enhancement film can comprise a single layer or at least two layers of retardation layers. A cholesteric liquid crystal layer also can be provided by combining layers different in the reflection wavelength and it can be configured by overlapping two or at least three layers. As a result, the obtained retardation plate can reflect circularly polarized light in a wide wavelength range including a visible light region, and this can provide transmission circularly polarized light in a wide wavelength range.

A polarizing plate according to the present invention can be an optical member made by laminating the heat-treated polarizing plate and two or at least three optical layers. In other words, the polarizing plate can be a reflective polarizing plate or a semitransparent polarizing plate for elliptically polarized light, which is prepared by combining either the above-mentioned reflective polarizing plate or a semitransparent polarizing plate with a retardation plate.

An optical member comprising a laminate of two or at least three optical layers can be formed in a method of laminating layers separately in a certain order for manufacturing a liquid crystal display etc. Since an optical member that has been laminated previously has excellent stability in quality and assembling operability, efficiency in manufacturing a liquid crystal display can be improved. Any appropriate adhesion means such as a pressure-sensitive adhesive can be used for laminating the polarizing plate and optical layers.

The above-described members composing the polarizing plate and the optical member, such as a polarizing film, a transparent protective film, an adhesive layer, can have ultraviolet absorption power as a result of treatment with an ultraviolet absorber such as an ester salicylate compound, a benzophenone compound, a benzotriazole compound, a cyanoacrylate compound, and a nickel complex salt compound.

Polarizing plates according to the present invention can be used preferably for forming various devices such as liquid crystal displays. Such a polarizing plate is arranged on at least one surface of a liquid crystal cell in order to form a liquid crystal display of, e.g., a transmission type, a reflection type, or a transmission-reflection type. A liquid crystal cell to compose the liquid crystal display can be selected from appropriate cells of such as active matrix driving type represented by a thin film transistor, a simple matrix driving type represented by a twist nematic type and a super twist nematic type.

When polarizing plates or optical members are arranged on both surfaces of a liquid crystal cell, the polarizing plates or the optical members on the surfaces can be the same or can be varied. Moreover, for forming a liquid crystal display, one or at least two layers of appropriate members such as a prism array sheet, a lens array sheet, an optical diffuser and a backlight can be arranged at proper positions.

EXAMPLES

The present invention will be described below more specifically by referring to Examples and Comparative Examples. In the following Examples, '%' and 'part' mean 'weight %' and 'weight part' respectively except where specifically noted.

Example 1; Comparative Example 1

Samples Nos. 1–7 (polarizing plates), 8–14 (elliptically polarizing plates), 15–21 (wide-visual-angle polarizing plates), and 22–28 (elliptically polarizing plates) were prepared in the following manner for evaluation tests.

A. Preparation of Polarizing Plate Samples (1) Samples Nos. 1–7 (Polarizing Plates)

PVA films 80 $\mu$m in thickness were stretched 5 times the original length in an aqueous solution of iodine so as to prepare polarizing films 30 $\mu$m in thickness. On both surfaces of the respective polarizing films, triacetylcellulose films (protective layers) 80 $\mu$m in thickness were adhered through PVA-based adhesive layers so as to produce polarizing plates. The thus obtained polarizing plates were heat-treated at 65° C. for 30 minutes, left to room temperature (30° C.), reheat-treated under the conditions shown in Table 1, and subsequently, an acrylic adhesive layer (or an acrylic pressure-sensitive adhesive layer) 25 $\mu$m in thickness was arranged on one surface of each of the polarizing plates. Separators were arranged on the other surfaces of the acrylic adhesive layers.

(2) Samples 8–14 (Elliptically Polarizing Plates)

On the respective reheat-treated polarizing plates prepared in the same manner as the samples Nos. 1–7, brightness enhancement films (PCF 350 produced by Nitto Denko Corporation) were laminated so as to align the straight polarized light transmission axes. The separators of the reheat-treated polarizing plates were peeled off, and the brightness enhancement films were adhered to the surfaces of the exposed acrylic adhesive layers. Next, on the other exposed surfaces of the brightness enhancement films, acrylic adhesive layers 25 $\mu$m in thickness were arranged so as to provide reheat-treated elliptically polarizing plates.

(3) Samples Nos. 15–21 (Wide-Visual-Angle Polarizing Plates)

PVA films 80 $\mu$m in thickness were stretched 5 times the original length in an aqueous solution of iodine so as to prepare polarizing films 30 $\mu$m in thickness. On one surface of each of the polarizing films, a triacetylcellulose film (protective layer) 80 $\mu$m in thickness was adhered through a PVA-based adhesive, and on the other surface an optically compensating retardation plate (a protective layer having an optically compensating function) 110 $\mu$m in thickness was adhered through a PVA-based adhesive layer so as to produce each laminate. The optically compensating retardation plates have optically anisotropic layers made of an incline-oriented discotic liquid crystal polymer and supported by triacetylcellulose films. Next, the laminates were heat-treated at 70° C. for 30 minutes, left to room temperature (30° C.), and further reheat-treated under the condition shown in Table 1. Next, acrylic adhesive layers (or acrylic pressure-sensitive adhesive layers) each having a thickness of 25 $\mu$m and having separators placed thereon were arranged on the exposed surfaces of the optically compensating retardation plates so as to provide reheat-treated wide-visual-angle polarizing plates.

(4) Samples Nos. 22–28 (Elliptically Polarizing Plates)

Previously, norbornene-based polymer films (ARTON produced by JSR Corporation) 100 $\mu$m in thickness were stretched. Wide-visual-angle polarizing plates were produced in the same way as the samples Nos. 15–21, and separators on the acrylic adhesive layers were peeled off. The stretched norbornene-based polymer films were laminated on the exposed surfaces of the acrylic adhesive layers. In each of the laminates, the inclination direction of the discotic liquid crystal of the polarizing plate was parallel to the direction of the in-plane maximum refractive index of the polymer film. Subsequently, acrylic adhesive layers each having a thickness of 25 $\mu$m and having separators placed thereon were arranged on the exposed surfaces of the polymer films on the respective laminates so as to provide reheat-treated elliptically polarizing plates.

TABLE 1

| Samples | Reheating temperature | Treatment time |
| --- | --- | --- |
| 1, 8, 15, 22 | 80° C. | 3 minutes |
| 2, 9, 16, 23 | 65° C. | 10 minutes |
| 3, 10, 17, 24 | 55° C. | 20 minutes |
| 4, 11, 18, 25 | No heating | — |
| 5, 12, 19, 26 | 60° C. | 10 seconds |
| 6, 13, 20, 27 | 80° C. | 40 minutes |
| 7, 14, 21, 28 | 95° C. | 5 minutes |

B. Test for Evaluation of Optical Characteristics

During manufacture of each of the samples Nos. 1–7, and 15–21, the single hue value b of the laminate after reheat treatment was measured. For the measurement, an integrating sphere type spectral transmittance meter (DOT-3C produced by Murakami Color Research Laboratory) was used. The results are indicated in the following Table 2.

C. Dimensional Change Rate

Square specimens (100 mm×100 mm) were cut off respectively from the samples Nos. 1–7 and 15–21 in parallel to the stretching direction (MD direction) so as to measure the dimension (La) in the MD direction. The specimens were left at 50° C. for 120 hours, and then, a second measurement of the dimension (La') in the MD direction was carried out. The dimensional change rate was calculated by substituting measurement values La and La' into the following formula. The results are illustrated in Table 2.

$$\text{Dimensional change rate} = [(La'-La)/La] \times 100$$

D. Shrinkage Force

Rectangular specimens (width: 10 mm×length: 180 mm) were cut off respectively from the samples Nos. 1–7 and 15–21 in parallel to the stretching direction M direction), and the longitudinal ends of each specimen were fixed so that a spacing between chucks was 100 mm. Namely, the MD direction is identical to the longitudinal direction of the specimen. The specimens were left at 60° C. for 1 hour, and a shrinkage force was checked by measuring a load applied to each of the specimens. For the measurement, a tension tester (Autograph AG-1) produced by Shimazdu Corporation was used. The results are illustrated in Table 2.

E. Weight Change Rate (Weight Reduction Rate)

Square specimens (100 mm×100 mm) were cut off respectively from the samples Nos. 1–7 and 15–21 so as to measure the weight (Wa). The specimens were left at 120° C. for 2 hours, and then, a second measurement of the weight (Wa') of the same specimens were carried out. The weight change rate was calculated by substituting measurement values Wa and Wa' into the following formula. The results are illustrated in Table 2.

Weight change rate (%)=[(Wa−Wa')/Wa]×100

TABLE 2

| Samples | Shrinkage force (N/10 mm width) | Single hue value b (NBS) | Dimensional change rate (%) | Weight change rate (%) |
|---|---|---|---|---|
| 1 | 6.2 | 4.13 | −0.24 | 2.1 |
| 2 | 5.3 | 4.22 | −0.20 | 1.5 |
| 3 | 6.8 | 4.09 | −0.28 | 2.3 |
| 4 | 10.0 | 3.86 | −0.68 | 3.2 |
| 5 | 9.8 | 4.06 | −0.55 | 3.1 |
| 6 | 5.6 | 5.45 | −0.20 | 1.2 |
| 7 | 6.9 | 4.94 | −0.26 | 2.2 |
| 15 | 5.9 | 4.31 | −0.21 | 2.3 |
| 16 | 5.0 | 4.24 | −0.16 | 1.8 |
| 17 | 6.5 | 4.14 | −0.25 | 2.7 |
| 18 | 9.5 | 4.04 | −0.66 | 3.4 |
| 19 | 9.3 | 4.06 | −0.58 | 3.2 |
| 20 | 5.3 | 5.51 | −0.17 | 1.4 |
| 21 | 6.6 | 4.82 | −0.24 | 2.5 |

F. Brightness Irregularity Evaluation Test

Specimens (width: 200 mm x length: 150 mm) were cut off respectively from the samples Nos. 1–28 so that the specimens had an angle of 45 degrees with respect to and absorption axis of the polarizing plate. Each specimen was adhered through the adhesive layer to one surface of a glass sheet, and on the other surface of the same glass sheet, another specimen of the same sample was adhered in crossed Nicols in the same manner. After leaving the laminates at 50° C. for 36 hours, light transmittance was measured at nine points (i.e., four points at corners of the laminate, intersections on diagonal lines of these four points, and the medians of four sides connecting adjacent corners) in each laminate so as to calculate a difference between the maximum value and the minimum value. The results are illustrated in Table 3. A greater difference indicates a greater variation in the light transmittance, namely, the brightness irregularity is serious.

G. Visual Evaluation

Following the above-described evaluation test (F), brightness irregularity was checked visually for the samples Nos. 1–28, and hues in a white display of a liquid crystal display was checked visually. Evaluations for the visual check of the brightness irregularity and the hues were based on the following standards. The results are illustrated in Table 3.

(Brightness Irregularity)

A: substantially no spots caused by brightness irregularity are observed

B: spots caused by brightness irregularity are observed visually in the light (Hue)

A: a white display in a liquid crystal display remains substantially white

B: coloring is observed in a white display of a liquid crystal display

H. Total Evaluation

Based on the results of the brightness irregularity evaluation (F) and the visual evaluation (G), the samples were evaluated comprehensively. The results are illustrated in Table 3. In this table, 'A' denotes an excellent practicality and 'B' denotes impracticality.

TABLE 3

| Samples | Max. value-min. value of light transmittance (%) | Visual evaluation Brightness irregularity | Hue | Total evaluation |
|---|---|---|---|---|
| 1 | 0.03 | A | A | A |
| 2 | 0.03 | A | A | A |
| 3 | 0.04 | A | A | A |
| 4 | 0.13 | B | A | B |
| 5 | 0.12 | B | A | B |
| 6 | 0.02 | A | B | B |
| 7 | 0.02 | A | B | B |
| 8 | 0.05 | A | A | A |
| 9 | 0.04 | A | A | A |
| 10 | 0.05 | A | A | A |
| 11 | 0.13 | B | A | B |
| 12 | 0.11 | B | A | B |
| 13 | 0.04 | A | B | B |
| 14 | 0.04 | A | B | B |
| 15 | 0.04 | A | A | A |
| 16 | 0.03 | A | A | A |
| 17 | 0.05 | A | A | A |
| 18 | 0.11 | B | A | B |
| 19 | 0.11 | B | A | B |
| 20 | 0.02 | A | B | B |
| 21 | 0.03 | A | B | B |
| 22 | 0.04 | A | A | A |
| 23 | 0.04 | A | A | A |
| 24 | 0.06 | A | A | A |
| 25 | 0.13 | B | A | B |
| 26 | 0.13 | B | A | B |
| 27 | 0.02 | A | B | B |
| 28 | 0.04 | A | B | B |

Referring to the results in Table 2, the samples Nos. 1–3, 8–10, 15–17 and 22–24 (Examples) satisfy the requirements for the shrinkage force and the single hue value b according to the present invention. Samples Nos. 4, 5, 11, 12, 18, 19, 25 and 26 (Comparative Examples) do not satisfy the requirement for the shrinkage force, and samples Nos. 6, 7, 13, 14, 20, 21, 27 and 28 (Comparative Examples) do not satisfy the requirement for the single hue value b. As illustrated in Table 3, since the Comparative Examples (samples Nos. 4, 5, 18 and 19) have a shrinkage force greater than 8N/10 mm width, variation in the light transmittance was increased and brightness irregularity occurred. Similar problems were observed for the samples 11, 12,24 and 25 using these samples of Comparative Examples. Since the single hue values b for the samples 6, 7, 20 and 21 (Comparative Examples) were greater than 4.6 NBS, colors were observed in the white display of a liquid crystal display screen. Similar problems were observed for the samples 13, 14, 27 and 28 using the above-identified samples of Comparative Examples. In the samples (Examples) satisfying the requirements for the shrinkage force and the single hue value b, variation in the light transmission was decreased and the brightness irregularity was suppressed. Moreover, color tones did not change. That is, a polarizing plate of the present invention can be used for providing a highly precise liquid crystal display with suppressed brightness irregularity and optimized color tones.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A polarizing plate comprising a laminate comprising a polarizing film and a transparent protective layer provided on at least one surface of the polarizing film, wherein
   the laminate has a shrinkage force of at most 8N/ 10 mm width, wherein the shrinkage force is measured after the laminate has been left at 60° C. for 1 hour, and
   the laminate has a single hue value b of at most 4.6 NBS.

2. The polarizing plate according to claim 1, wherein the laminate is heat-treated and subsequently reheat-treated.

3. The polarizing plate according to claim 1, wherein the laminate that is left at 50° C. for 120 hours has a dimensional change rate of −0.3% to 0% in the stretching direction (MD direction).

4. The polarizing plate according to claim 1, wherein the laminate that is left at 120° C. for 2 hours has a weight change rate of at most 3%.

5. The polarizing plate according to claim 1, wherein the transparent protective layer has an optically compensating function.

6. The polarizing plate according to claim 1, wherein the polarizing plate further comprises a viewing-angle compensating film provided on at least one surface of the laminate.

7. The polarizing plate according to claim 1, wherein the polarizing plate further comprises an adhesive layer provided on at least one surface of the laminate.

8. The polarizing plate according to claim 1, wherein the polarizing plate further comprises an additional plate selected from the group consisting of a reflector and a transflector that is provided on at least one surface of the laminate.

9. The polarizing plate according to claim 1, wherein the polarizing plate further comprises a retardation plate provided on at least one surface of the laminate.

10. The polarizing plate according to claim 1, wherein the laminate further comprises a retardation plate provided on the transparent protective layer that is on at least one surface of the polarizing film.

11. The polarizing plate according to claim 9, wherein the retardation plate is at least one wavelength plate selected from the group consisting of a half wavelength plate and a quarter wavelength plate.

12. The polarizing plate according to claim 1, wherein the polarizing plate further comprises a brightness enhancement plate provided on at least one surface of the laminate.

13. A method of manufacturing a polarizing plate comprising a laminate having two exposed surfaces and comprising a polarizing film and a transparent layer provided on at least one surface of the polarizing film, wherein the method comprises:
   heat-treating the laminate and subsequently reheat-treating the laminate, so that the reheat-treated laminate has a shrinkage force controlled to be at most 8N/10 mm width, wherein the shrinkage force is measured after the reheat-treated laminate has been further left at 60° C. for 1 hour, and that the reheat-treated laminate has a single hue value be controlled to be at most 4.6 NBS.

14. The method according to claim 13, wherein the temperature for the heat treatment is from 40° C. to 75° C.

15. The method according to claim 13, wherein the temperature for the reheat treatment is from 50° C. to 90° C.

16. The method according to claim 13, wherein the laminate is heat-treated, left to lower the temperature to a point that is lower than the heat-treatment temperature by a range of 5° C. to 75° C. and lower than the reheat treatment temperature by a range of 5° C. to 90° C., and further reheat-treated.

17. A liquid crystal display comprising a liquid crystal cell and the polarizing plate according to claim 1, and the polarizing plate is arranged on at least one surface of the liquid crystal cell.

18. The method of claim 13, wherein the reheat-treatment is performed at a temperature of from 50° C. to 90° C. and for a time of from 0.5 minutes to 30 minutes.

19. The method of claim 18, wherein the heat-treatment is performed at a temperature of from 40° C. to 75° C. and for a time of 0.5 minutes to 60 minutes.

20. The method of claim 13, wherein the reheat-treatment is performed at a temperature of from 55° C. to 90° C. and for a time of from 0.5 minutes to 30 minutes.

21. The method of claim 20, wherein the heat-treatment is performed at a temperature of from 50° C. to 75° C. and for a time of 1 minute to 50 minutes.

22. The method of claim 13, wherein the reheat-treatment is performed at a temperature of from 55° C. to 85° C. and for a time of from 1 minute to 30 minutes.

23. The method of claim 22, wherein the heat-treatment is performed at a temperature of from 50° C. to 70° C. and for a time of 1 minute to 30 minutes.

24. A polarizing plate comprising a laminate having two exposed surfaces and comprising a polarizing film and a transparent protective layer provided on at least one surface of the polarizing film, wherein
   the laminate has a shrinkage force of at most 8N/10 mm width, wherein the shrinkage force is measured after the laminate has been left at 60° C. for 1 hour, and
   the laminate has a single hue value b of at most 4.6 NBS.

25. A method of manufacturing a polarizing plate comprising a laminate of a polarizing film and a transparent layer provided on at least one surface of the polarizing film, wherein the method comprises:
   heat-treating the laminate and subsequently reheat-treating the laminate, so that the reheat-treated laminate has a shrinkage force controlled to be at most 8N/10 mm width, wherein the shrinkage force is measured after the reheat-treated laminate has been further left at 60° C. for 1 hour, and that the reheat-treated laminate has a single hue value b controlled to be at most 4.6 NBS, and
   arranging the reheat-treated laminate on at least one surface of a liquid crystal cell.

26. A method of manufacturing a polarizing plate comprising a laminate of a polarizing film and a transparent layer provided on at least one surface of the polarizing film, wherein the method comprises:
   heat-treating the laminate and subsequently reheat-treating the laminate,
   wherein the reheat-treatment is performed at a temperature of from 50° C. to 90° C. and for a time of from 0.5 minutes to 30 minutes, so that the reheat-treated laminate has a shrinkage force controlled to be at most 8N/10 mm width, wherein the shrinkage force is measured after the reheat-treated laminate has been further left at 60° C. for 1 hour, and that the reheat-treated laminate has a single hue value b controlled to be at most 4.6 NBS.

27. The polarizing plate of claim 1, wherein the polarizing film is made from a dyed and stretched film.

28. A polarizing plate comprising a laminate comprising a polarizing film and a transparent protective layer provided on at least one surface of the polarizing film, wherein the polarizing film is made from a dyed and stretched film, the laminate is a heat-treated and subsequently reheat-treated laminate, and the laminate has (i) a shrinkage force of at most 8N/10 mm width, wherein the shrinkage force is measured after the laminate has been left at 60° C. for 1 hour, and (ii) a single hue value b of at most 4.6 NBS.

29. The polarizing plate of claim 28, wherein the reheat-treatment is performed at a temperature of from 50° C. to 90° C. and for a time of from 0.5 minutes to 30 minutes.

* * * * *